July 20, 1965   E. P. BENTLEY ETAL   3,195,357
ACCELERATION SENSITIVE DEVICE AND OPERATIVE
MEANS ASSOCIATED THEREWITH
Filed April 13, 1953   4 Sheets-Sheet 1

INVENTORS
Edward P. Bentley
Charles A. Speas
BY
Ezekiel Nily
ATTORNEY

July 20, 1965 E. P. BENTLEY ETAL 3,195,357
ACCELERATION SENSITIVE DEVICE AND OPERATIVE
MEANS ASSOCIATED THEREWITH
Filed April 13, 1953 4 Sheets-Sheet 2

INVENTORS
Edward P. Bentley
Charles A. Spears.
BY
ATTORNEY

July 20, 1965 E. P. BENTLEY ETAL 3,195,357
ACCELERATION SENSITIVE DEVICE AND OPERATIVE
MEANS ASSOCIATED THEREWITH
Filed April 13, 1953 4 Sheets-Sheet 3

INVENTORS
Edward P. Bentley
Charles A. Speas
BY

INVENTORS
Edward P. Bentley
Charles A. Speas
BY

United States Patent Office 3,195,357
Patented July 20, 1965

3,195,357
ACCELERATION SENSITIVE DEVICE AND OPERATIVE MEANS ASSOCIATED THEREWITH
Edward P. Bentley, Waltham, and Charles A. Speas, Wellesley, Mass., assignors, by mesne assignments, to Kollmorgen Corporation, Garden City, N.Y., a corporation of New York
Filed Apr. 13, 1953, Ser. No. 348,171
5 Claims. (Cl. 73—503)

The present invention relates generally to acceleration-sensing devices and more particularly to a device capable of use either as an accelerometer or an integrating accelerometer.

One object of the present invention is to provide an instrument which eliminates springs and coulomb friction and will yet accurately compute and furnish a signal which is proportional to the time integral of applied acceleration along the measuring axis of the instrument.

Another object of the invention is to provide a spring-free acceleration-sensing device adapted to operate in combination with a gyroscope and associated amplifier and control means automatically to guide a moving vehicle accurately along a prescribed course in space.

Another object of the invention is to provide a novel method and apparatus for measuring changes in the velocity of a body whereby the shear rate of a viscous liquid provides an accurate time integral of the acceleration forces applied to said body.

Another object of the present invention is to provide such acceleration-sensing device which is also capable of use independently of any gyroscopic means for measurement or control purposes in conjunction with a moving system itself sufficiently stabilized with respect to space.

Another object of the present invention is to provide an improved accelerometer of greatly increased accuracy and sensitivity, which wholly eliminates reliance on spring elements, and which is wholly free from the troublesome influence of coulomb friction.

Other objects will appear from the following detailed description, the accompanying drawings, and the appended claims.

According to the fundamental laws of motion the velocity change of any body in a given direction "$x$" is:

$$\Delta V x = V_{t_1} - V_{t_0} \int_{t_0}^{t_1} a_x dt$$

where $V_{t_1}$ and $V_{t_0}$ are the velocities at times $t_1$ and $t_0$ respectively in the "$x$" direction, and $a_x$ is the acceleration along the "$x$" direction at any instant of time.

Thus, by instantaneously and continuously measuring and integrating acceleration against time, the velocity change can be determined continuously without reference to any bodies external to the moving system. This is particularly useful in determining the velocities of moving vehicles, such as airplanes or boats, where stationary elements are not readily available for speed measurement, such as is the ground for surface vehicle, because water or air may itself be moving relative to the earth. Such instrumentation is of particular value when used to measure velocity changes along three coordinate axes of a vehicle such as an aircraft. Thus, if the velocity of a craft is measured in the fore and aft direction and vertically and horizontally at right angles to the heading of the craft, then its velocity change in space may be determined singularly. Such measurements are of exceptional use and value when applied to the control of guided missiles, torpedoes, the landing of aircraft on carriers by automatic means, or the socalled "blind" landing of aircraft under other conditions; and are particularly notable in that the effects of cross air currents or water currents may be completely measured and overcome by the equipment.

In modern high speed vehicles, the range of accelerations and velocities to be measured is great. For example, modern guided ordnance weapons may have accelerations as low as $\frac{1}{1,000}$ that of gravity acting on them over extended periods of time, or they may have accelerations as high as 1,000 gravities acting on them for very short periods of time. The relative effects of acceleration and time result in certain velocity changes. In order to properly measure these velocity changes, an acceleration sensitive device must be capable of accurate measurement over the range of $10^{-3}$ to $10^{+3}$ gravities. Such a wide range of measurement is extraordinary.

A basic limitation of prior art devices designed to integrate acceleration has been that those devices have had to measure acceleration discretely and then separately perform the integration operation on the acceleration signal. In most cases the measurement of acceleration has depended on the reaction of a mass of some sort in combination with a spring or springs, and some quantity of viscous damping and coulomb friction, the acceleration function being determined by the motion of the mass in its medium. Measurement over a range of $10^{-3}$ to $10^{+3}$ gravities as required, for example, in the control of guided missiles, has not been possible by such conventional means due to the presence of dry friction at the lower end of the scale or due to mechanical limitations inherent in such systems at the higher end of the scale. Such systems are also limited by their natural frequency, which is a function of the mass and the spring restraint. Even with proper viscous damping, it is usually feasible to operate only up to frequencies of approximately 0.7 of the natural frequency. If this natural frequency is established at a level which will permit response to high frequency impulses, the ability of the system to properly sense accelerations of small magnitude is impaired; conversely, if the natural frequency is established at a level which will permit reasonable response to accelerations of low magnitude, the ability of such a system to respond to high frequency transients is limited. Thus, accurate measurements involving accelerations over a range such as $10^{-3}$ to $10^{+3}$ gravities are not possible by such conventional means.

The present invention performs the integration of applied accelerations directly through the response of a buoyant mass whose motion in the direction of measurement is determined by externally applied accelerations and resultant, opposing internal viscous restraint, all as described below. The measurement is thus made entirely independent of springs and coulomb friction, so that limitations ordinarily imposed by natural frequency and dry friction are overcome.

In applications of acceleration sensing where it is desired that the sensing directions be fixed relative to space, it is essential that the sensing device be directionally established with respect to space. Such stability is customarily derived from the operation of a gyroscope. It would, of course, be highly advantageous to be able to incorporate the acceleration sensing device in the gyro rotor or to have it physically connected directly with some part of the gyro which is directionally stabilized in space, for then all errors which would otherwise be introduced by servo-systems or the like operatively connecting the gyroscope to the acceleration-sensing device would be entirely eliminated. In other words, it would be highly desirable to associate the acceleration-sensing device directly with the gyroscope, for that assures that the spin axis of the gyro rotor will accurately establish and maintain the measurement direction of the acceleration-sensing device. A further advantage of tying in the acceleration-sensing device directly with the gyroscope is the elimination of any need for costly and space-consuming intermediate servo-mechanisms. Moreover, the introduction of the acceleration-sensing device directly into the stabilized part of the gyroscope structure, and particularly into the rotor itself, would afford obvious advantages for the standpoint of compactness and economy of weight. If attempted to be used directly with a gyroscope such as on a platform directly stabilized by a gyroscope, conventional sensing devices employing, as they do, relatively substantial masses, would seriously limit the ability of the gyroscope to maintain stability because of the appreciable shifts in mass which would occur within the sensing device. With the present invention, however, the mass involved can, and indeed preferably should be, of such small magnitude that the aforesaid shifts in mass would have only negligible effect on stability. Furthermore, as explained in the detailed description which follows, the design of the present invention is such that a practical and indeed feasible location would be inside the gyro rotor.

The device of the present invention can, therefore, readily be physically incorporated in or directly connected with the gyroscope or directly associated platform without imparing the proper functioning of the gyroscope, and thus achieve all the foregoing advantages which are wholly unobtainable with the prior art devices.

It might be thought that the stability-disturbing influence of prior art acceleration-sensing devices when connected directly to the gyroscope structure could be overcome by moving the acceleration-sensing device to a physically separate servo-stabilized platform slaved to the gyro. Such servo-stabilized platform, however, would not be slaved accurately enough, particularly under high angular acceleration transients to avoid significant errors in acceleration measurement and integration. The device of the present invention, however, eliminates the need for such costly and space and weight consuming servo systems, and provides for more accurate and reliable data than was heretofore possible. The device of the present invention is capable of accurate acceleration measurements over this range, and, furthermore, may be used to measure velocity from zero to thousands of feet per second. The device is thus particularly useful for the measurement of velocity changes and the application of such measurements for the control of all types of modern high speed weapons and vehicles.

Figure 1:
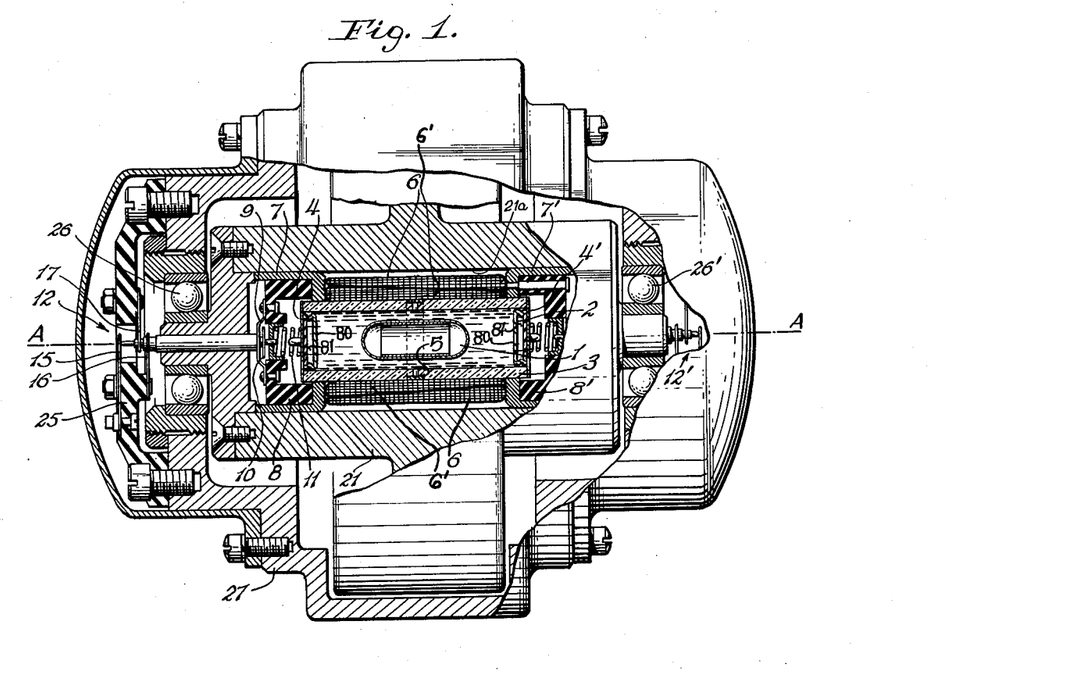
FIGURE 1 shows an integrating accelerometer constituting an illustrative embodiment of the present invention, in a gyroscope environment.

Referring to FIGURE 1, a small capsule-like member 1 is shown immersed in a liquid medium 2 in a cylindrical container 3 having end caps 4 and 4'.

While the container 3 may be a cylindrical body, the shape of the body 3 may vary with symmetrical cross sections of polygons and even to some extent unsymmetrical sections. However, symmetrical sections are preferred, and in the specification and claims below, cylindrical hollow body is intended to include these shapes as its equivalent. The length of the body should be preferably but not necessarily greater than its diameter, whereby the body may be designated as an elongated body with end walls or caps 4 and 4'.

Figure 2:
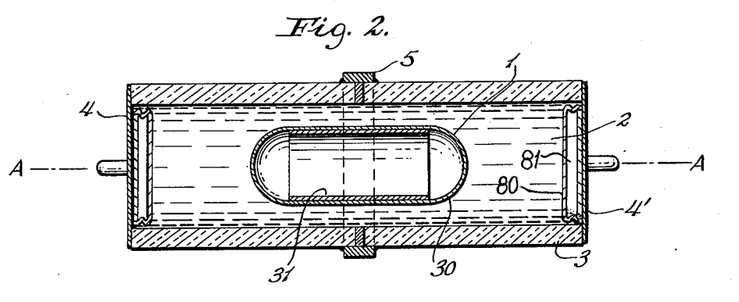
FIGURE 2 is an enlarged vertical-sectional view through the centrally located sealed cylindrical chamber, which carries a sensitive buoyant member immersed in the integrating fluid, and shown centered on the rotation axis A—A as in actual operation.

In the arrangement shown, member 1 is a hollow sealed body which may be made of any suitable structural material that is liquid tight so that when completed it will float in the liquid 2. Member 1 may be made either of a solid material of density less than that of the liquid, or of higher density material formed into a thin shell, so that the net displacement of the formed element is sufficient to give it buoyancy in liquid 2. For reasons hereinafter developed, it is desirable to have element 1 at least partially constructed of material with some magnetic permeability such as nickel or iron, or of some permanent magnet material, and also partially of material that has reasonable high electrical conductivity. It is possible, however, to utilize materials that are substantially non-conductive (electrical insulators instead of conductors) and still obtain satisfactory operation. It is also possible to construct the buoyant element of two or more different materials, as for example an outer fluid-tight case 30 of copper, and an inner lining 31 of iron or other magnetic material as shown in FIGURE 2.

The free element 1 should have a diameter sufficiently large to partially fill the cross section within the chamber of the body 3 but sufficiently small to prevent coulomb friction between the free element and the wall of the chamber. It may be theoretically shown that by having the free element fill the greater part of the cross section of the chamber, the deleterious effect of fluid flow in the chamber due to possible temperature gradients or differences in the fluid in the chamber may be substantially decreased. However, the more effective way of minimizing this effect has been found to be the reduction of the bore of the chamber containing the liquid and free element, especially where high rotational speeds are involved. The reasons for such dimensioning will become apparent after a further consideration of the method of operation of the device. It is sufficient for this part of the description to emphasize that the diameter of the chamber should be as small as possible for reasons which will become apparent in a subsequent portion of this description. The free element must have a correspondingly smaller diameter to permit free motion with only viscous retarding force. The minimum size of the free element is limited because it must be buoyant and should preferably be electrically conductive and magnetic; in general, the smaller the diameter of such free element, the more difficult it is to retain all of these characteristics. Thus, to some extent, the minimum size of the bore would be limited indirectly. One set of bore and free element diameters which has been utilized successfully is that of a chamber having a cross section diameter of ⅛" and a free element having a cross section diameter of 1/16".

The liquid 2 employed in the illustrated embodiment of the invention preferably has the following properties (a) specific gravity, high enough to float the buoyant member, (b) substantially true "Newtonian" viscous properties within a selected range of viscosity and velocity gradients, (c) electrical conductivity to an adequate degree, and (d) electrolytic characteristics which will permit the passage of current therethrough without the formation of gas. There are many liquids or solutions available which posses these characteristics. One example of a suitable liquid is a mixture of 93 parts (by volume) of glycerine and 7 parts (by volume) of a solution composed of 147 grams of copper sulphate dissolved in 100 cubic centimeters of distilled water. The electrolysis of such solution, unlike certain other salt solutions, will not cause the formation either of a gas, or of any substance which will react with water or glycerine to form a gas when carrying a rapidly reversing current. This is important, of course, as the presence of one or more gas bubbles on the axis A—A could impair the proper integration of input acceleration increments. It should be noted further that the use of A.C. voltage for excitation of the integrating accelerometer does not preclude the formation of gas in cases where gas formation is part of the electrolytic process. It can be shown by test as well as by theory that in such cases gas will form at a rate which is inverse function of the frequency of the excitation voltage. Use of A.C. voltage of some reasonable high frequency is suggested then, to minimize formation of gas in case there are small quantities of salts in solution which may tend to form gas at the electrodes. It should be further noted that solutions which do not involve gas formation during electrolysis will involve exchange from one electrode to another of solid material; thus the use of A.C. voltage is suggested to prevent the permanent loss of material at any of the electrodes involved.

The use of a catalyst such as platinum to comprise some part of the structure such as an electrode or the external casing of the buoyant element may be helpful in uniting deionized material to their original composition.

Other suitable conductive viscous fluids or liquids may be used as for instance natural substances like "honey" or syrups or synthetic or natural viscous resins with substances in solution or suspension to provide conductivity provided these viscous fluids fill the specifications set forth above. In those applications of the present invention where high rotational speeds are involved, the centrifuge action of such rotational speeds must not be sufficient to separate such substances in suspension if such substances are employed.

If now the container 3 is completely filled with liquid and is rotated about its longitudinal axis A—A, a radial pressure gradient will be set up across the tube due to centrifugal force. This gradient, forces the member 1, which is comparable to a restrained bubble, to seek and remain centralized along the tube axis A—A. The member is thus maintained on the axis of rotation of A—A and is thus free of any friction which will otherwise result from direct contact with the wall of the container 3. Furthermore, and particularly at high rotational speeds, the radial force field permits the entire unit to be subjected to substantial shock and acceleration loads at right angles to the axis of rotation without displacing the buoyant member sufficiently to cause it to contact the wall of the container 3. Flexure of the end caps 4, and 4' is only one of the many different ways of compensating for thermal expansion of the liquid. One could, if desired, provide one or more hermetically sealed, flexible closed chambers inside container 3 located, say, at the ends of the container 3. These could be so constructed as to permit the accommodation of the full expansion of the liquid without exceeding the elastic limit of the material used for the flexible-walled chambers.

In the illustrated embodiment, container 3, is made of electrically non-conductive material while the end caps 4 and 4' and the centrally located annular terminal ring 5 are made of electrically conductive material such as copper. With this arrangement an electrical circuit is formed which includes elements 1, 4 and 5, and liquid 2, all of which act as conductors. The surface of member 1 in contact with liquid 2 may be either conductive or non-conductive, as desired. A number of turns of wire comprising two coils 6 and 6' may encircle the container 3.

The coils 6 and 6' surrounding the sealed cylindrical chamber 3 may be tapered with the coil 6' having more turns longitudinally along the axis to the left as viewed in FIGURE 1 and the coil 6 with more turns at the right of FIGURE 1. This makes it possible to vary the force acting on the free element, when it has a permanent magnet all along the axis of the sealed chamber.

Figures 6, 7:
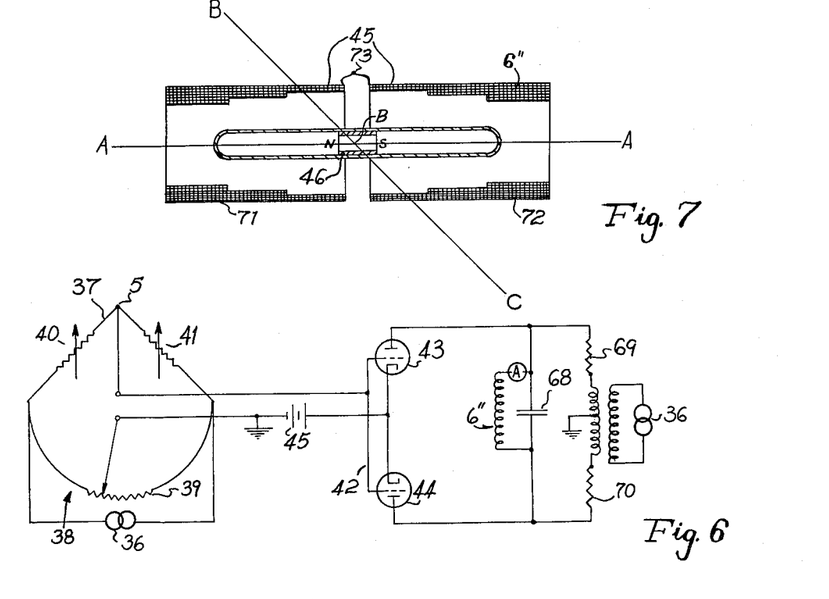
FIGURE 6 is a circuit diagram showing how the buoyant member of the single force coil modification shown in FIGURE 7 may be shifted or controlled at will.
FIGURE 7 represents an enlarged vertical sectional view through the central chamber portion of a modified form of acceleration-responsive device, employing but a single force coil acting in conjunction with a permanent magnet element, to apply a force to the buoyant member in the chamber.

By applying voltage to one or the other of these coils, a magnetic force can be applied to the capsule member 1 through its inner iron sleeve 31 to move it in one direction or the other along the spin axis A—A. FIGURE 7 illustrates an alternative arrangement which employs a specially wound single coil 45 acting in conjunction with a permanent magnet member secured in the capsule 1. The coil 45 is wound in such a manner that the current passing through the turns of the coil produces a magnetic field gradient along the path of the capsule member 1. In the presence of this field gradient, the capsule member is subjected to a force along the tube axis, the direction of which is determined by the direction of the current in the coil. Thus when a D.C. voltage is applied to the coil 45, a force is applied to the capsule through its permanent magnet member which will move the capsule in either direction, as desired—the direction being determined by the polarity of the applied voltage.

As shown in FIGURE 1, structural cap cylinders 7 and 7' having inturned end flanges may serve to mount the core of the entire acceleration sensitive device in an axial bore 21a of a rotor assembly 21. Electrical insulating blocks 8 and 8' made of electrical insulating material serve to interconnect the lead wires of coils 6 and 6', end caps 4 and terminal ring 5, to a series of three concentric insulated tubular conductors indicated generally by the numeral 12 through the conductive strips or brushes 9 and 10 and spring 11. Similar connections and conductors may be used at both ends of the rotor.

The conductive strips 9 and 10 and such others as may be used for completing connections to the coils 6 and 6' and the terminal ring 5, are secured to the terminal block 8 and 8' in different diametrical relations concentric with the tubular conductors 12 which are coaxial with the spin axis so that electrical connections may be made to the coils 6 and 6', the conductive ring 5 and the end caps 4 and 4' while the sealed chamber and the whole unit is spun or rotated about its axis.

The end caps 4 and 4' may have plain conductive wall members which may have a certain amount of elasticity to allow for expansion due to pressure changes in the fluid in the sealed chamber which preferably is completely filled at all times or the end caps 4 and 4' may have a bellows 80 as a part of or attached to the end wall, which bellows is conductive and has as internal chamber or space 81 filled with a suitable fluid to allow for expansion or contraction of the fluid in the sealed chamber.

It will be understood that the concentric conductors 12 are electrically insulated from each other by intermediate concentric sleeves made of insulating material. The outer ends of the concentric conductors 12, are preferably surfaced with material suitable for slip ring action. Brushes 15, 16 and 17 act to conduct current from the slip ring portions of the tubular conductors to non-rotating terminal lugs on the shroud end plates 25. Thus, by means of the illustrated arrangement, a total of six electrical paths are provided between the spinning rotor and the stationary case or shroud. The number of concentric conductors provided, and hence the number of separate electrical paths can be increased or decreased as may be required by the environment in which the acceleration responsive device is to be employed.

Ball bearings 26 and 26' may serve to support the rotor and the acceleration sensing device within a shroud and gimbal unit 27. Although in FIGURE 1 the rotor is shown enveloped by a shroud 27 with no further suspension indicated, it is to be understood that in actual use the rotor assembly 21, when part of a gyroscope, would be completely gimballed by conventional methods so as to permit the rotor to assume and maintain a fixed axis in space, without regard to vehicle motion. The rotor 21 may be spun by any suitable means, not shown.

In the particular embodiment of the invention shown in the drawings, the acceleration sensing device is shown included within a surrounding rotor. For purposes of acceleration measurement and integration alone, it is not, however, essential that the acceleration sensing device be within such rotor or flywheel, so long as it is spun. If, however, it is desired to use the acceleration sensing device to indicate velocity in a plane fixed with reference to space, it can very conveniently be mounted or embodied directly in the gyro rotor of either a vertical gyro or a directional gyro. To this end outer casing 27 may be suspended in conventional gimbals (not shown) to permit operative freedom of the gyro or the integrating accelerometer with appropriate spinning means may be mounted on or in a stable platform.

Figure 3:
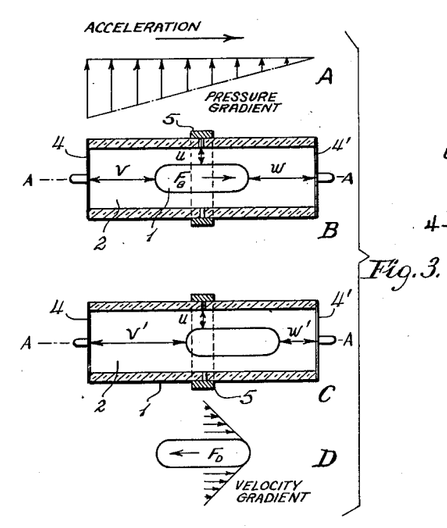
FIGURE 3 shows diagrammatically how acceleration forces acting on the device move the acceleration-sensitive member by an amount corresponding to the time integral of acceleration or the velocity change.

The process of integrating the axially applied acceleration follows as a direct result of the axial pressure gradient which is set up in the liquid without regard to the radial pressure gradient previously described. This axial pressure gradient acts on the member 1 in the same manner that the pressure gradient acts on a body submerged in a liquid subjected solely to gravitational acceleration. The axial pressure gradient as shown in FIGURE 3 is directly proportional to the acceleration applied to the acceleration sensing device in the direction of the axis A—A. The proportionality is indicated by the slope of the line which defines the magnitude of the pressure at any point. The slope of the line shown in the illustration defines the instaneous pressure gradient produced by the acceleration $A_{AA}$ at some time $t$.

The pressures established by this axial pressure gradient are, of course, applied equally in all directions. Those pressures acting perpendicularly to the axis A—A result in zero net axial force on the member 1, while the pressures acting in the direction of the axis A—A result in an axial force which is the product of the mass of the liquid displaced by the buoyant member, $m_L$, and the acceleration, $A_{AA}$. This force, $F_B$, acting on the member 1 is then directly proportional to the applied acceleration, or:

$$F_B = \text{constant } x A_{AA} = m_L A_{AA}$$

where $A_{AA}$ = the acceleration applied along the rotation axis A—A and $m_L$ is the mass of the liquid displaced.

A second force acting on the buoyant member 1 is that due to the acceleration of the member itself. This acceleration, which is the absolute acceleration of the member 1, is the sum of the applied acceleration $A_{AA}$ and the acceleration of the member 1 relative to the cylinder 3. Thus the force resulting directly from this absolute acceleration may be defined as:

$$m_m\left(A_{AA} + \frac{d^2x}{dt^2}\right)$$

where $m_M$ is the mass of the buoyant member 1, and $x$ is the displacement of that member 1 relative to the cylinder 3. It should be noted that the direction of this force is opposite to that applied to the member 1 by the pressure gradient.

Certain inertial, thermal and other forces will be applied to the buoyant member as a result of motion of the liquid in the chamber, but by taking proper precautions as outlined in this specification, they may be minimized and kept negligible. There exists, however, a significant viscous force which acts on the buoyant member 1.

Referring to FIGURE 3, since the member 1 is suspended in a liquid which has a density greater than that of the member, the resultant of the above described acceleration forces to move that member along axis A—A towards the right hand end cap 4. As soon as its starts to move, however, a velocity gradient is set-up in a transverse sense, as suggested in FIGURE 3D. Thus, at the boundary between the moving member 1 and the liquid, that is to say at the outer surface of member 1, the velocity of the liquid in a direction parallel to axis A—A and relative to the wall of the container 3 is equal to the velocity of the member 1. At the outer boundary of the liquid in the tube, however, that is to say at the inner surface of the wall of the cylindrical container 3, the relative motion of liquid and container is zero. A velocity gradient, therefore, exists in a radial sense between member 1 and the container 3, provided the liquid is viscous and substantially laminar flow exists. The velocity gradient so established by the relative motion of the member 1 and outer tube 3 causes a viscous back force, $F_{drag}$ in FIGURE 3D opposing that motion. For a given mechanical design and dimensions, and a given fluid, this viscous back or drag force can be expressed as:

Force $_{(drag)}$ = (constant) × (velocity of member 1, relative to the tube 3) = $K\dfrac{dx}{dt}$ In the given case, where member 1 is buoyant, this viscous force acting on the member 1 has a direction opposite to the direction of the applied acceleration since the buoyant member 1 moves, relative to the cylindrical container 3, in the direction of the applied acceleration.

Summing up the forces applied to buoyant member, including acceleration forces, the following equality results:

$$m_L A_{AA} - m_M\left(A_{AA} + \frac{d^2x}{dt^2}\right) - K\frac{dx}{dt} = 0$$

or $$(m_L - m_M) A_{AA} - m_M \frac{d^2x}{dt^2} = K\frac{dx}{dt}$$

Note in the above equation that certain dynamic forces due to motion of the liquid in the chamber have been omitted and as it will be shown later these forces in the present design may be minimized to the extent that they may be neglected. The quantity $(m_L - m_M)$ has a constant value, and may be referred to as the "buoyant mass," $m_L - m_M = m_B$
Thus:

$$m_B A_{AA} - m_M \frac{d^2x}{dt^2} = K\frac{dx}{dt}$$

Integrating the foregoing over a period of time $t_1$ to $t_2$, during which $x$ (the displacement of member 1 relative to cylinder 3) and $A_{AA}$ (the acceleration applied in the direction AA) vary, we get:

$$m_B \int_{t_1}^{t_2} A_{AA} dt - m_M \int_{t_1}^{t_2} \frac{d^2x}{dt^2} dt = K \int_{t_1}^{t_2} \frac{dx}{dt} dt$$

or $$m_B(V_{t_2}-V_{t_1}) - m_M\left[\left(\frac{dx}{dt}\right)_{t_2} - \left(\frac{dx}{dt}\right)_{t_1}\right] = K(x_{t_2}-x_{t_1})$$

Where $V_{t_1}$ and $V_{t_2}$ are the velocities of the vehicle at times $t_1$ and $t_2$ along axis A—A.

In many applications the period of measurement $t_1$ to $t_2$ would be such that the applied acceleration $A_{AA}$ is zero at times $t_1$ and $t_2$. If there is no applied acceleration at those instants, there are no forces then applied to the buoyant member, and its velocity $dx/dt$ would be zero at times $t_1$ and $t_2$. In other cases the applied acceleration $A_{AA}$ is the same at each time, the resultant velocities of the buoyant members, $dx/dt$, would be the same. In either of the foregoing two cases the term $$m_M\left[\left(\frac{dx}{dt}\right)_{t_2} - \left(\frac{dx}{dt}\right)_{t_1}\right]$$

will be zero and can be disregarded. In any case by designing the system so as to make the relative motion $x$ very small the term $dx/dt$ will be negligible when compared with the velocity of the vehicle containing the measuring device.

Thus for all practical purposes, we can assume that:

$$m_B(V_{t_2}-V_{t_1}) = K(X_{t_2}-X_{t_1})$$

where $(V_{t_2}-V_{t_1})$ the change in velocity of the vehicle carrying the acceleration sensing device, and $(x_{t_2}-x_{t_1})$ is the displacement of buoyant member 1 relative to the cylinder 3. Thus the displacement of that buoyant member is always proportional to and an accurate measure of the change in velocity of the vehicle along the axis AA over any period of time.

If axis AA is stabilized in space by being part of a free gyroscope or some stable platform then the change in velocity is measured relatively to an axis fixed in space regardless of vehicle maneuver, provided that the gyro or other stable platform is not subject to precession forces or other errors.

The acceleraion sensing device is preferably housed or enclosed in a shield or sleeve made of material having high thermal conductivity, such as the steel or iron hub of the rotor 21, FIGURE 1. This tends to maintain the ends of the device in thermal equilibrium. If a temperature gradient were to exist from one end of the tube to the other, the density of the fluid would vary from one end to the other, and due to high rotational speed, a radial force field would be set up causing the heavier fluid to move out radially at the colder end. The net result of this circulatory flow, in the absence of other forces, would be to cause the buoyant member to drift slowly toward the colder end. The pattern of the circulatory flow due to temperature difference between ends of the device can be shown experimentally and theoretically to be as follows: The liquid flows outward radially at the colder end thence along the wall of the cylindrical chamber and from the wall radially inward toward the center at the warmer end. From the warmer end the liquid moves parallel to the spin axis A—A along the side of the buoyant member toward the colder end. Thus the tendency of a temperature difference is to move the buoyant member toward the colder end. This undersirable condition would, therefore, produce errors in integration, inasmuch as temperature differences between ends of the device would produce the same apparent result as an acceleration applied to the vehicle. Thermal effects of this type may be kept sufficiently small as to be of negligible importance, through the use of a shield of high thermal conductivity as aforesaid, as well as by reducing to a minimum the internal diameter of tube 3. It should be borne in mind that parts illustrated in the drawings have been expressly enlarged for purposes of clarity, and that the actual tube and buoyant member diameters suitable for proper operation must be considerably smaller than those indicated in the drawings. For example, in one operative embodiment, the inside diameter of tube 3 was 1/8 inch, and the outside diameter of member 1 was 1/16 inch. In some accurately made units the diameters of the chamber and inner body are considerably smaller.

Figure 13:
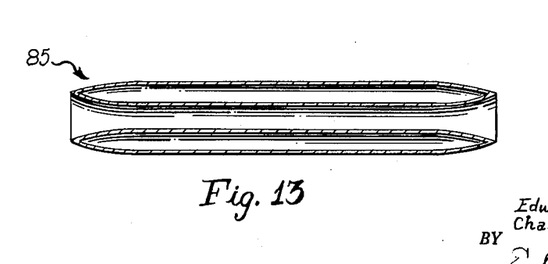
FIGURE 13 shows a modification of the buoyant member.

Under the influence of the forces within the liquid produced by temperature difference between ends of the chamber, a buoyant member in the shape of a hollow cylinder would not necessarily react in the same manner as the buoyant member with sealed ends as described above. A buoyant member in the shape of a hollow tube would move in either direction depending on the location of its exterior surfaces with respect to the thermal circulatory flow. Such a buoyant, hollow member of large diameter would move toward the warmer end whereas a member with small diameter would move toward the colder end. There is, in fact, a neutral radius at which there is zero net circulatory flow; a buoyant, hollow cylinder with its surfaces located at this neutral radius would thus be unaffected by the thermal flow described above. Such a buoyant member would otherwise have similar properties and construction as the sealed end buoyant member described. The exact dimensions required of such a buoyant member to fit the neutral radius would be subject to experimentation and calculations for any given case. Such a buoyant member 85 is shown enlarged in FIG. 13.

In addition to the precaution of using a shield or sleeve around the acceleration sensing device to maintain thermal equilibrium, it is also beneficial, as a means of preventing the aforesaid axial temperature gradient, to thermally isolate the device and its thermal equilibrium shield. Such a precaution will prevent deleterious heat flow whereas the shield serves to evenly distribute the "residual" heat flow which the isolation does not prevent.

As the buoyant member 1 moves under acceleration forces, the liquid near the center must flow around it. In doing so, a given element of liquid flows out or in, radially, and will be, as a result, accelerated tangentially by Coriolis forces (as the end result of the conservation of angular momentum). The direction of this tangential liquid motion at either end of the moving buoyant member will be opposite to the direction at the other end.

$\Delta P$ is pressure difference caused by the acceleration of particles from one end of the chamber to the other parallel to the axis. Due to the motion of the buoyant member there is a radial particle flow which at the leading end of the buoyant member is outwardly from the center and at the trailing end is inwardly to the center. When the body containing the liquid and buoyant member is spun about its central axis A—A, the law of the conservation of angular momentum causes a slight increase in $\omega$, the angular velocity of the particles flowing inwardly to the center, and a slight decrease in angular velocity of the particles flowing outwardly of the center at their respective ends of the buoyant member. The effect of this is to increase slightly the total pressure at the leading end of the buoyant member as compared with the total pressure at the other end of the buoyant member. This increase acts in a direction opposite to the applied axial acceleration and may be of sufficient magnitude to make the buoyant member stand still. The design of the present apparatus is to reduce this effect to a minimum. This is accomplished by several means which may be used effectively singly or in combination to minimize this effect and other effects including thermal drift and energy interchange between buoyant member and liquid in the following manner:

(1) Reduce the axial motion of the buoyant member by increasing the viscosity of the liquid.

(2) Reduce the rotation speed of the acceleration sensitive device.

(3) Reduce the diameter for the buoyant member.

(4) Reduce the diameter of the bore.

(5) Make the buoyant member in the shape of a hollow cylinder rather than a cylinder with ends sealed off. Motion of the element would, at either end, move liquid outward from the center and inward toward the center thus providing a cancellation effect to minimize the Coriolis motion.

In the range of velocities of 200 feet/sec. to be read as full scale on the integrating accelerometer in either axial direction of the $a$–$s$–$d$, with rotor speeds usually employed in gyroscopes, permitting maximum tolerable random motion equivalent to one milli gravity (.032 ft./sec.$^2$) and a density of the buoyant member equal to 80% that of the liquid displaced the following values give some limits to be applied to the apparatus for such useful operation.

(a) The viscosity of the liquid should be 20 centipoises or greater. The upper limit is determined by the ability to discriminate small motions of the element. A liquid having a viscosity of 300 centipoises has been used in successful apparatus.

(b) Liquid density should be 1.50 gms./cc. or less. The lower limit is imposed by nature in that few liquids with sufficient viscosity have densities much less than 1.00 gm./cc.

(c) Bore diameter of the cylinder 3 should be 1/8″ or less. The smaller the diameter, the better will be the performance from the point of view of random motion, the lower limit being determined by one's ability to construct small sizes particularly with respect to the buoyant member 1.

If the operating conditions set forth above are changed then the parameters set forth in paragraphs (a), (b) and (c) above may be changed correspondingly. For example, if the rotor speed is decreased, the bore diameter may be increased with no change of random motion of the free member. If, as a further example, the limits on random motion of the free member are relaxed (increased) then both or either the rotor speed and the bore diameter could be increased.

As an example of successful operation of an $a$–$s$–$d$ as an integrating accelerometer, the following characteristics were built into the unit.

Bore diameter 1/8″—free element 1/16″
Viscosity 300 centipoises
Density 1.25 gms./cm.$^3$
Rotor to operate at 15,000 r.p.m.

The bore length was 3/4″ and the free element length 9/16″ but these latter two dimensions are not considered as having particularly critical limits.

The rotor speed may be reduced for more successful performance but practical limits on such speed reduction is imposed by the fact that the buoyant member must be centered or at least kept from contact with the wall of the cylinder and also by the fact that when in a gyro unit it must spin at sufficient angular momentum as required by the gyro.

The features of the small bore described above with respect to the unit aid also in minimizing the thermal drift effect. As a further aid in this respect, the unit may be thermally insulated and there may be good thermal conduction between opposite ends of the unit. All parts of the unit may be maintained closely at the same temperature and the unit should be completely housed as indicated in FIGURE 1 or in some equivalent manner.

In the above discussion consideration was given to the outward flow at the leading end of the buoyant member and inward flow at the rear end of the buoyant member.

However, as the liquid near the center flows outwards at one end of the member 1 and inward at the opposite end a flow path may be seen to exist from one end of the member outward, along the side of the member and thence inward. Two basic questions arise concerning this liquid flow (aside from the problem of Coriolis and thermal forces set up as described in the foregoing paragraphs). The first question is one of energy exchange between the liquid and the member by this flow; in other words, errors might be thought to be introduced by such exchange during respective periods of applied acceleration and deceleration. The effect of this energy exchange and the accompanying radial and axial flow of the liquid along the tube (exclusive of viscous shear motion of the liquid) can be shown mathematically and empirically to have zero net effect on the motion of the buoyant member 1, when either zero or equal accelerations exist at the beginning and end of the integrating intervals. In effect, the energy transmitted to the liquid by motion of the buoyant member during acceleration is transmitted back to the buoyant member during deceleration so that the integral resultant forces along the tube axis is zero. The second question derives from the fact that the radial velocity gradient which FIGURE 3D shows existing in the liquid between member 1 and tube 3 is, instead, a sum of two velocity gradients or patterns. There exists in this liquid between element and tube the velocity pattern shown in FIGURE 3D plus the velocities produced as a result of the liquid's motion from the front to the rear of the member 1. The resultant total radial velocity pattern is not linearly proportional to the radius as shown in FIGURE 3D; however, tests have shown that the resultant force as applied to the buoyant member as a result of viscous friction between liquid layers is, nevertheless, linearly proportional to the velocity of this member relative to the tube. Thus the relationship $$F_D = K\frac{dx}{dt}$$

as given in the foregoing explanation will apply regardless of the non-linearity of the radial velocity gradient caused by liquid flow from front to rear of the buoyant member. For this to be true, it is necessary, of course, that the shear rates in the liquid be within a range in which the liquid exhibits truly viscous characteristics.

All effects such as those described in the foregoing paragraphs involving motion of the liquid other than that of the viscous shear can be minimized by a proper choice of liquid with sufficiently high viscosities and sufficiently low densities. This can be verified by examination of theory involved and by experiment.

In order to be useful for control purposes, the position of the buoyant member at any time must be measureable. The method of measurement here devised puts substantially no force on the buoyant member thus avoiding errors in integration which would otherwise result. Electrophoretic effects in the viscous liquid are always so small that they can be safely neglected. In the construction described herein, the viscous liquid 2 is an electrolyte having the properties of an electrical conductor. Referring to FIGURE 3, it will be noted that when the buoyant member 1 is centered, the electrical resistances between the central ring electrode 5 and the left and right hand end electrodes 4, 4′, along the paths $v$ and $\omega$ respectively, are identical. However, when the member 1 has been displaced to the right as shown in FIGURE 3, the resistance along path $\mu$ plus $v'$ including the intermediate highly-conductive portion of member 1, is greater than the resistance along path $\mu$ plus $\omega'$ including the intermediate highly-conductive portion of member 1. By proper proportioning, the relative changes in resistance can be made nearly proportional to displacement of the buoyant member from center. Furthermore, by proper selection of electrolyte material and, therefore, of electrolyte constant, the specific resistance of the fluid can vary with temperature in such a manner as to compensate for the variation of viscosity of the fluid with temperature, thereby further eliminating temperature-induced error in the generation of an electrical signal corresponding to axial displacement of the member 1 as a result of velocity change. This is explained further in a subsequent part of this description.

Figure 4:
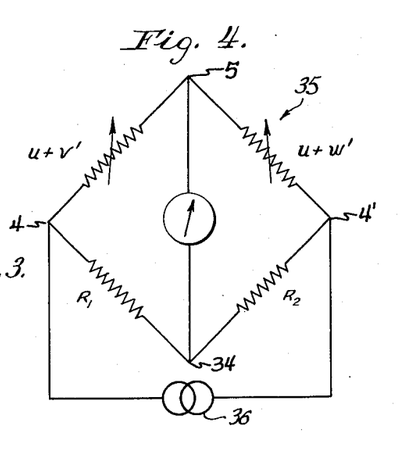
FIGURE 4 is a circuit diagram showing how the velocity change represented by the motion of the buoyant member of FIGURES 2 and 3 can be indicated or measured electrically.

In the measuring circuit illustrated in FIGURE 4, the liquid resistances $\mu$ plus $\nu'$, and $\mu$ plus $\omega'$, are shown connected as two arms of a resistance bridge network 35, the other two arms being external fixed resistors $R_1$ or $R_2$. When the bridge is excited from a suitable voltage source 36, a voltage which is closely proportional to the off-center displacement of the buoyant member 1 can be obtained between the center contact ring electrode 5 and the junction point 34 of the resistors $R_1$ and $R_2$. This voltage is, therefore, a measure of the position of the buoyant member 1. It will be observed that the aforesaid electrical signal pick-off means for measuring the position of the movable buoyant member 1 avoids the application of any force on that member. Thus, the actual position of the buoyant member is determined substantially by external acceleration forces, and is in no sensible way affected by the position measuring means. An equivalent circuit may be obtained by replacing separate resistors $R_1$ and $R_2$ with a center-tapped transformer secondary winding, and having the primary winding excited by an A.C. source 36. The unit's output signal is then read between the center contact ring electrode 5 and the transformer center tap.

Figure 5:
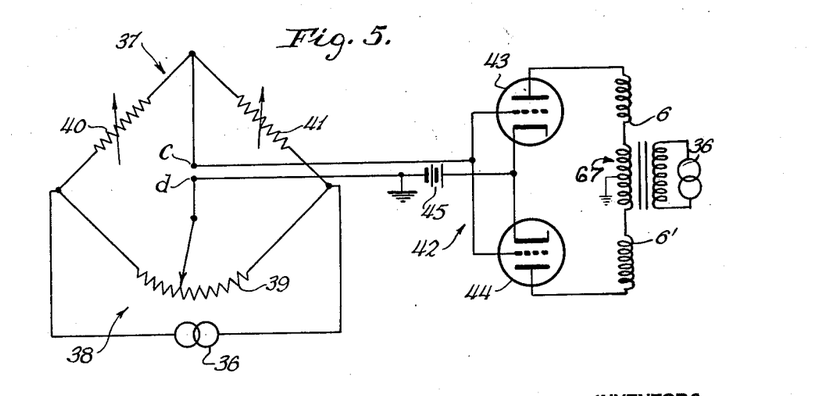
FIGURE 5 is a circuit diagram showing how the position of the buoyant member within the device can be shifted or controlled at will.

FIGURE 5 illustrates one arrangement for positioning or setting the buoyant member at any desired point along the axis of the tube. The bridge network there shown includes two arms 40 and 41, corresponding to the resistance paths $\mu$ plus ' (or $\nu'$) and $\nu$ plus $\omega$ (or $\omega'$) respectively, and a potentiometer 39 the various resistive component portions of which correspond to the resistors $R_1$ and $R_2$ of FIGURE 4. A source of A.C. voltage 36, applied across the potentiometer 39 excites the bridge network. This same voltage source is also applied to the primary of an input transformer 67, the secondary of which is connected through force-coil windings 6 and 6' to the anodes of a pair of triode tubes 43, 44. The grids of these tubes are tied together and connected to the junction of arms 40 and 41, corresponding to the center contact ring electrode 5, while the cathodes are tied together and connected, through a D.C. voltage source 45 to the grounded movable arm of the potentiometer 39. The midpoint of the secondary of the transformer 67 is also grounded.

When the bridge circuit 38 is excited by A.C. voltage from source 36, voltage of the same frequency and phase is applied as shown to the plates of tubes 43 and 44, causing rectified pulsating current to flow in coils 6 and 6'. The difference in magnitude of the currents in coils 6 and 6' will be a function of the phase and magnitude of the voltage on the grids of the tubes, and thus a function of the position of the buoyant member 1. Referring to FIGURE 1, the two coils 6 and 6' are wound in such a manner that current in coil 6 will produce an electromagnetic field gradient which increases toward the right hand end 4', whereas current in coil 6' will produce a field gradient which increases toward left hand end 4. The circuit in FIGURE 5 is, then, such that slight movement of the buoyant member 1 away from the desired position established by the setting of the potentiometer arm, and toward say the right hand end 4' will increase the rectified current in coil 6'. This, then, will move the member 1 back toward the desired position. In like manner motion away from the desired position toward left hand end 4 will produce a correcting force on the buoyant member toward the right hand end 4'. The position of the member 1 is thus determined by the adjustment of the external potentiometer 39, the positioning forces resulting from the presence of gradients in electromagnetic field strength along the tube axis.

The circuit shown in FIGURE 5 could be utilized equally well for the purpose of associating the acceleration sensing device with the control means of a moving vehicle when it is desired that the motion of such a vehicle be maintained in a prescribed direction. To illustrate one example of such an application it would be required that the circuit in FIGURE 5 be altered by using in place of the force coils 6 and 6' two primary actuating mechanisms operatively controlled by the bridge circuit to actuate a rudder or other steering device. Current through one of these actuating mechanisms which in this altered use is represented by coil 6 would tend to move the rudder or other steering mechanism so as to cause motion of the vehicle in the appropriate corrective direction. Current through the actuating mechanism which in this altered use, is now represented by 6' would tend to move the rudder or the other steering mechanism so as to cause motion of the vehicle in the opposite direction. Thus with the arrangement shown in FIGURE 5, as altered in the above manner, action of the control surface or other steering means will take place in response to the voltage signal produced by the a–s–d. A more detailed explanation of the exact manner in which space motion may be controlled by such an arrangement is given in a subsequent part of this description.

FIGURES 6 and 7 illustrate an alternative arrangement to that shown in FIGURE 5. In this alternative arrangement a buoyant member 1 comprises or carries a permanent magnet 46 the poles of which are oriented along the tube axis A—A as shown in FIGURE 7. The position of this buoyant member is controlled by varying the magnitude and direction of the current in the force coil (which may for additional purposes be shaped as 45 in FIGURE 7) by using the circuit of FIGURE 6 which is quite similar to that shown in FIGURE 5. In the circuit arrangement of FIGURE 6, two resistances of equal magnitude 69 and 70 have replaced the coils 6 and 6' shown in FIGURE 5. In addition to this change, the circuit in FIGURE 6 has but a single force coil 6''. One end of this force coil is connected to the plate of the tube 44 while the other end is connected in series with a current reading meter to the plate of tube 43. In parallel with this ammeter-force coil series combination there is a capacitance, the ends of which are thus electrically connected to the plates of the tubes 43 and 44. Though the ammeter is not essential to proper operation of the device when used to control the motion of a vehicle, it is desirable in some cases to be able to read the current in the force coil. This FIGURE 6 circuit functions similarly to that shown in FIGURE 5 except that instead of obtaining different currents in each of two force coils, 6 and 6' one current is obtained in the single force coil 6'' whose magnitude and direction is a function of the position of member 1 relative to its desired position. Without the capacitance, 68, the direct current in the force coil would pulsate. It is the purpose of this capacitance to smooth out these pulsations; this smoothing is not essential but might be desirable in some applications of the present invention.

The force coil function need not be limited merely to that of positioning the buoyant member. It can also be utilized to apply a force equivalent to a given acceleration, for any of a number of different purposes. For example, it may be desirable to operate the integrating accelerometer device with the axis AA vertical, in which case gravitational force must for many applications, be cancelled out. This can be readily accomplished with the device of the present invention by applying a current to the force coil of sufficient magnitude to just cancel out the gravitational force acting on the buoyant member by an amount equivalent to a given velocity, by applying a force coil "acceleration" for a known amount of time. It is obviously advantageous in both these cases to have this force produced by the force coil entirely independent of the member's position, and directly proportional to the current in the coil. The latter requirement is satisfied in theory as well as in practice by using a permanent magnet material in or for the buoyant member; the former requirement will be satisfied by winding the coil in such a manner that the electromagnetic field gradient along the axis A—A is a straight line function of member's position along the axis. This can be done to a very high degree of accuracy. When the electromagnetic field gradient is a straight line function of the position of the buoyant member along the measuring axis, the force exerted on that member will be constant or independent of the element's position. This is due to the fact that the force exerted on a permanent magnet body in a magnetic field in a direction, $x$, is substantially equal to the rate of change of field flux, $\phi$, with respect to $x$. The approximate configuration of a winding which will produce a constant $d\phi/dx$ along the measuring axis is shown in cross section in FIGURE 7. This specially shaped winding 45 is actually composed of two distinct halves 71 and 72 which are joined at the point 73. For a given D.C. current, $i$, the portion 71 produces a flux intensity versus location along axis A—A as shown by the plot between the point B and the axis. When this same current, portion 72, which is wound in the opposite tangential sense to portion 71, produces a flux intensity distribution as shown by the plot from the axis A—A to point C. The D.C. current, $i$, through the two halves in series thus produces the desired flux gradient as shown by the slope of the line B–C.

With such a specially wound coil included in the device, the latter may also be used as an accelerometer. The magnitude of the acceleration applied to the device along the direction of the axis A—A at any time can readily be measured in terms of the D.C. current in the force coil required to keep the buoyant member from moving. Under such conditions, the force produced by the force coil would at all times have to be equal and opposite to the applied acceleration forces; thus the current in the force coil is an accurate and reliable measure of the applied acceleration at any time. Referring to FIGURE 6, the ammeter, A, which is placed in series with the force coil, may serve a useful function by indicating the current required to prevent motion of the buoyant member which is, for the reasons stated above, an indication of the acceleration applied to the acceleration sensing device along the axis A—A at any time.

Figure 8:
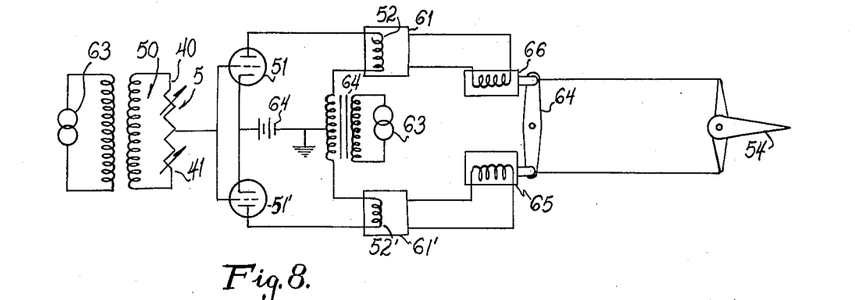
FIGURE 8 is a schematic circuit diagram showing how the acceleration-responsive device of the present invention may be employed to control automatically a vehicle rudder or other control surface.

The manner in which this acceleration sensing device may be used for control purposes will now be described. The arrangement illustrated in FIGURES 8, 9 and 10 will serve to maintain a vehicle in motion on a predetermined, constant direction. Referring to FIGURE 8, voltage source 63 excites a transformer the secondary 50 of which forms two of the legs of a bridge network. This secondary 50 is centertapped in the application being described in such a manner that equal and opposite A.C. potentials are applied to the ends of the arms 40 and 41. These two arms 40 and 41 correspond to the resistance paths $\mu$ plus $\nu$ (or $\nu'$) and $\mu+\omega$ (or $\omega'$) respectively as shown in FIGURE 4. The ends not connected to the equal and opposite A.C. potentials are connected together within the acceleration sensing device to form its basic signal point 5. This same voltage source 63 is also applied to the primary of a reference transformer 64 the secondary of which is connected through the two primary portions 52 and 52' of two actuating mechanisms 61 and 61' to the anodes of a pair of triode tubes 51 and 51'. The centertap of the secondary of this transformer is connected to ground. The grids of these tubes are tied together and connected to the junction 5 of the arms 40 and 41. This junction, which has been referred to as the basic signal point, corresponds to the center contact ring electrode 5 as shown in the acceleration sensing device illustration of FIGURE 1. The cathodes of the two tubes 51 and 51' are tied together and connected through a D.C. cathode biasing voltage source 64' to ground potential which corresponds electrically to the center taps of the two transformers referred to above. The power amplifier or booster actuating mechanisms 61 and 61' are connected to conventional boosters which are shown in FIGURE 8 as electromagnetic type solenoid plungers. These plungers are connected to the ends of a yoke 64''. Two cables connected to the ends of this yoke 64'' are joined at their opposite ends to a rudder 54 in such a manner that angular motion of the yoke 64'' about its center pivot point will move the rudder 54 to either side of its neutral position for the purpose of vehicle control.

Figure 9:
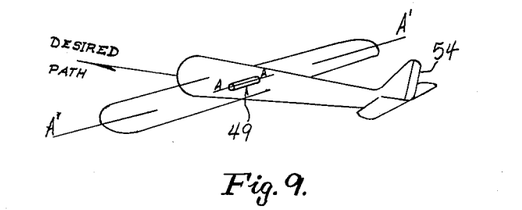
FIGURE 9 is a simplified view of a representative vehicle bearing the controlled rudder shown in FIGURE 8, and showing the orientation of the acceleration-responsive device when it is desired to measure and compensate for velocity changes along the axis A—A.

FIGURE 9 illustrates the schematic relative directions of the axis A—A of the acceleration sensing device and the desired direction of motion. For the purpose of explanation, the vehicle illustrated in FIGURE 9 may be assumed to be an aircraft flying in a horizontal path with a gyro containing the acceleration sensing device secured in some manner to the aircraft and with the axis A—A of the acceleration sensing device coincident with the spin axis of the gyro unit. Thus this axis A—A will be fixed with respect to space during the controlled flight of the aircraft. The control means in this case is the rudder 54 which is connected to the control system in the manner shown in FIGURE 8. The axis A'A' represents a direction that is perpendicular to the desired direction of motion. It is realized that in the ordinary flight of such an aircraft, control surfaces other than the rudder, 54, are utilized to guide the aircraft; however, for purpose of this illustration the rudder, 54, is used to simplify the explanation.

Figure 10:
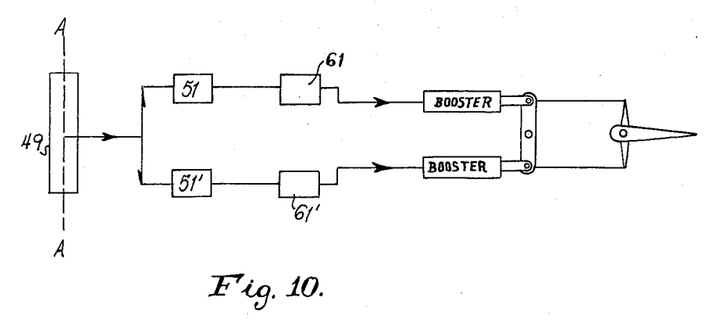
FIGURE 10 represents a simplified block diagram of the device and the associated circuit of FIGURE 8 applied to the vehicle of FIGURE 9.

FIGURE 10 is illustrative of the general method of control implied by the above FIGURES 8 and 9. From the acceleration sensing device 49 to signal proportional to velocity change is illustrated as being transferred to amplifier means 51 and 51'. The outputs of these amplifiers are connected to the booster actuating mechanisms 61 and 61' and the outputs of the actuating mechanism are tied to their respective rudder boosters. The boosters, in turn, are fastened by cables or other suitable means to the control rudder.

For the purpose of the explanation, the axis A'A', which has been defined as being perpendicular to the desired direction of motion, will also represent the alignment of the axis AA of the acceleration sensing device. The axis AA and thus A'A' will coincide with the transverse axis of the aircraft only when the aircraft is flying perfectly horizontal in a condition of no lateral wind (i.e., when the aircraft is not "yawing"). The axis AA may be initially set in this desirable alignment in the manner to be explained in a subsequent portion of this description.

It is further necessary, prior to setting the aircraft into controlled flight, that the buoyant member 1 of FIGURE 1, 2 and 3 be brought to a point along the axis AA where the resultant signal from the acceleration sensing device as applied to the grids of the tubes 43 and 44 FIGURE 5 be zero. This may be seen in FIGURE 1 to be the point where the buoyant member is located equidistant from electrodes 4 and 4' to which the A.C. excitation voltage is applied. This positioning may be accomplished in the manner which has been explained in a preceding part of this description.

When the buoyant member and the axis A—A are positioned in the manner described above, the aircraft may begin controlled flight. Whenever the aircraft is subjected to accelerations along this preselected axis A'A', which would, therefore, cause the aircraft to deviate from the desired path, a velocity change will be indicated by the acceleration sensing device 49 as a voltage applied to the grids of the tubes 51 and 51' in the circuit of FIGURE 8. The voltage applied across the end electrodes of the acceleration sensing device is of the same frequency as the voltage applied to the plates of the tubes 51 and 51' and these two applied voltages have the same phase relationship. Thus a differentially rectified current will exist in coil 52 and 52' depending on the phase of the signal applied to the grids of the tubes 51 and 51' which phase is determined by the direction of the lateral velocity change. The magnitude of the differentially rectified current will depend on the magnitude of the velocity change. It is only necessary to apply this current in coil 52 or 52', amplified if necessary, to some type of actuator 61 or 61' which can either directly, or through conventional booster means 65 and 66, alter the setting of the aircraft rudder 54. The effect of the rudder change is to change the heading of the aircraft, so that a velocity component along the axis A'A' is built up sufficient to reduce the signal of the acceleration sensing device back to zero, at which time the aircraft will have completely nullified the lateral velocity error along axis A'A' caused by external disturbing forces.

A further use of the force coil may be its application, as follows, for the control of a moving vehicle whose control system might be similar to that described above. If, for example, it were desired to have a missile fly at a given velocity at any time, one procedure would be as follows:

(a) Starting with the vehicle at zero and signal of the a.s.d. at zero, apply a known current to the force coil for a known amount of time such that the resultant $\int a \, dt$ is equal and opposite to the velocity desired; then (b) Bring the velocity of the missile in the direction involved by steering, or by applying accelerating forces in some other manner, until the output signal of the device is again zero. In other words, the procedure is to apply a programmed amount and direction of current to the force coil such that $\int a \, dt$ is equal and opposite to the velocity desired at any time, and then to fly the missile in the direction called for by the signal at such speed and in such direction as to constantly maintain zero net output signal from the acceleration sensitive device.

Figure 11:
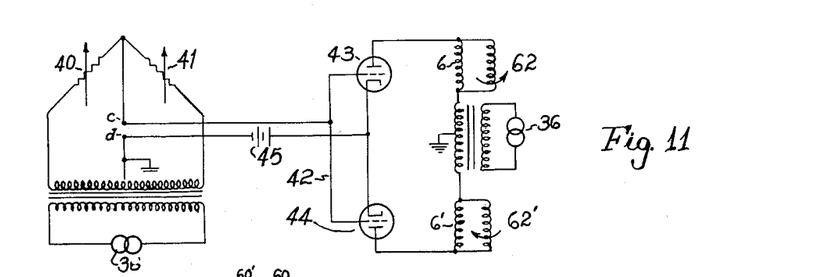
FIGURE 11 is a circuit diagram showing how the integrating accelerometer may be used to level a gyroscope.

FIGURE 11 illustrates an arrangement whereby the signal of the acceleration sensitive device is utilized for the purpose of levelling a gyro unit. This circuit arrangement is the same as that shown in FIGURE 5 with two exceptions. The two fixed legs of the bridge circuit in FIGURE 5 are two equal resistances, whereas in the circuit of FIGURE 11, these two fixed legs are the two halves of a centertapped transformer secondary; this latter bridge circuit corresponds to the type shown in FIGURE 8. This first change is not a required alternate to the method shown in FIGURE 5, but is an optional alternate given to illustrate another method of utilizing the signal from the acceleration sensitive device. The second difference between the circuit of FIGURE 5 and that shown in FIGURE 11 is that two coils 62 and 62' in FIGURE 11 have been added in parallel to the two force coils 6 and 6' shown in FIGURE 5. For the purpose of this explanation, as suggested before, the axis of the acceleration sensitive device is coincident with the axis of a gyro. The signal produced by the device is used to bring its buoyant member to center as before by applying differentially rectified currents to coils 6 and 6'. The two coils 62 and 62' which have been added in parallel relation to coils 6 and 6' are torque motors capable of precessing the level axis by applying torque to the axis of the gyro 90° removed. Current through 62 can apply torque in one direction while 62' applies torque in the other direction. These torque coils are so connected that when the buoyant member 1, under the influence of, say, a slight upward tilt of the left hand end 4', moves off toward that left hand end, the level axis AA will be tilted by the precession action of the torque coils so as to lower that end. In this manner the buoyant member will not only be brought to center, but also the level axis will be continuously adjusted as required so that there will be no tendency for the member to move off center. This levelling means may also be used in conjunction with the force coil method of centering the buoyant member which method was described in a preceding part of this explanation. Such a combination can form a very desirable system for automatically levelling the axis AA and locating the buoyant member 1 in its proper initial position along the axis AA.

Figure 12:
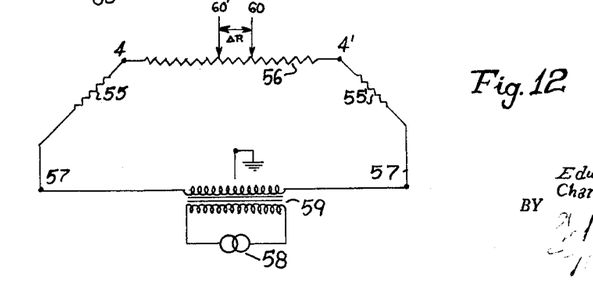
FIGURE 12 is a circuit diagram illustrating the effect of the property of the constant nature of the product of viscosity $x$ conductivity exhibited by certain viscous liquids.

One particular feature of the viscous type of acceleration sensing device described in this specification is its utilization of natural physical laws in order to obtain temperature compensation. It is well known in the theory of electrolytic conduction that for many fluids over certain ranges of concentration, the product of viscosity and electrical conductivity is almost constant. Thus if the temperature surrounding the device increases to the point where the viscosity of the fluid is halved, then the actual displacement of the buoyant member for a given velocity change will be double that which would occur at the lower temperature. Simultaneously however, the conductivity of the fluid has increased, that is, its resistance has decreased. If the bridge circuit of the acceleration sensing device be revised as shown in FIGURE 12, this characteristic of the fluid can be utilized to compensate for the variation in viscosity with temperature in such a manner that the voltage output from the integrating accelerometer for a given velocity change will be substantially constant over a wide range of temperatures. Since this temperature compensation depends solely upon certain physical properties of the conducting, viscous fluid and is thus wholly independent of any added corrective currents or other artificial means, the accuracy of compensation is very great. FIGURE 12 illustrates the bridge circuit excitation method whereby the ends 57 and 57' of the centertapped secondary of the transformer 59 are applied to the acceleration sensing device modified for the temperature compensation. The primary of the transformer 59 is excited by an A.C. voltage source 58. The modification of the acceleration sensing device for the purpose of temperature compensation consists in the illustration of FIGURE 12, of the addition of two special resistances 55 and 55'. The resistance 55 is interposed between the excitation point 57 and the end electrode 4 of the device. The resistance 55' is interposed in the same manner between the excitation point 57' and the end electrode 4' of the device. The signal point 60 of the device represents the zero signal point of the buoyant member 1. The signal point 60' represents the output of acceleration sensing device with its buoyant member displaced from center by some finite amount of resistance which is shown in FIGURE 12 as ΔR. This amount of buoyant member displacement is proportional to the $\int a \, dt$ or the velocity change to which the device has been subjected in the direction of the axis AA. Suppose now that the temperature of the device is raised to the point where the viscosity of the liquid in the tube is ½ of the original reference. A given velocity change will then cause twice the motion of the buoyant member and twice the resistance change ΔR, provided the resistance of the electrolyte were unaffected by temperature. However, due to the same temperature rise which halved the viscosity, the effective resistance per unit length of fluid also has been cut in half, so that the actual resistance change at the higher temperature for a given velocity input is substantially identical with that which would have occurred at the reference temperature, although the physical displacement involved is twice as great. Resistances 55 and 55' are preferably very large compared to resistance 56, so that the current flowing in the circuit comprising 57, 55, 56, 55' and 57' is substantially constant despite changes in temperature. Therefore, a given change of resistance induced by a given change in vehicle velocity will cause a given voltage output, and that output will, therefore, be constant regardless of ambient temperature of the acceleration sensing device.

In certain fluids where the product of viscosity times resistance might not be exactly constant over the operating temperature range, the resistances 55 and 55' may be made of materials having slight positive or negative temperatures coefficients. In this manner the current through the closed series circuit will be a slight function of temperature and by proper choice of constants it is thus possible to obtain a voltage output as a function of velocity change applied to the accelerometer sensing device which is substantially independent of temperature effects over very wide temperature ranges. The value of such automatic temperature compensation is apparent in control system for moving vehicles, guided missiles, or other applications where wide temperature extremes are likely to be encountered.

Without temperature compensation as described above thermostatting of the device to a particular temperature would be essential to accurate operation in many applications of the device. Thus temperature compensation is particularly important where the overall control system must be set into operation almost instantaneously since in such an application time is not available to adjust the temperature of the device to this exact thermostatted value. This method of temperature compensation is one which can maintain a constant calibration between the time integral of the applied acceleration and the voltage output of the acceleration sensitive device regardless of the temperature of the liquid. However, while such a method of compensation allows wide latitude in what the value of temperature can be, it does not permit changes in that value of temperature during the integration process.

Several further amplifications which have been omitted may be made to the specification above.

The terms $a$–$s$–$d$ used in the specification are abbreviations for acceleration sensitive device. By coulomb friction is meant, a friction which opposes motion but in which there is no predictable mathematical relation between force and the motion. On the other hand viscous friction is a force which opposes motion and in which there is a predictable mathematical relation between the force and the motion; namely this force is fundamentally proportional to the velocity in a so-called Newtonian fluid. The term levelling the gyro axis is applied in general to the levelling of the horizontal rotating axis of the gyro.

In the specification the end walls of the sealed chamber are stated as being conductive. It is sufficient in most cases that a conductive electrode be secured in the inside of the end wall or projecting from it.

It may also be mentioned that a suitable conductive viscous fluid may be a lubricant of the type called "Ucon," manufactured by Union Carbon & Carbide Co.

Having now described our invention, we claim:

1. In a system for controlling the velocity of a moving body
an elongated container adapted to be rotatably supported by said body and having non-conductive inner walls and conductive end walls defining a sealed chamber;
a conductive fluid in said chamber;
a free capsule member immersed in said fluid and having conductive walls which contain a magnetic permeable material;
said container being adapted to be rotatably driven at high speeds about the axis of said chamber so as to create a radial centrifugal pressure field in said fluid and thereby maintain the axis of said capsule member substantially coincident with the axis of said chamber;
electric coil means surrounding said member for establishing a magnetic field that varies in strength along the axis of the chamber;
bridge means for measuring the respective resistances of the fluid between said conductive walls of said capsule member and the respective conducting end walls of said container;
and means controlled by the last mentioned means for controlling the energization of said coil means when said body is accelerated in a direction parallel to the axis of said chamber.

2. Apparatus as defined by claim 1 additionally comprising power operated means for changing the direction of motion of said body, and means controlled by said bridge means for controlling the operations of said power operated means.

3. In an accelerometer,
a rotor having an axial bore formed therein;
means for rotatably mounting said rotor;
an elongated container disposed in said bore and rotatably secured to said rotor, said container having non-conductive cylindrical side walls and conductive end walls forming a sealed chamber;
a conductive ring mounted on the inner cylindrical wall of said container;
a conductive fluid in said chamber;
a free capsule member immersed in said fluid and having conductive walls which contain a magnetic permeable material;
at least one electric coil secured in said bore and positioned so as to surround an appreciable length of said chamber for establishing a magnetic field that varies in strength along the axis of the chamber;
a plurality of brushes mounted on said rotor support means and being respectively electrically connected to said container end walls, said coil and said ring;
said rotor being adapted to be rotatably driven at high speeds about the axis of said chamber so as to create a radial pressure field in said fluid and thereby maintain the axis of said capsule member substantially coincident with the axis of said chamber;
and means for measuring the respective changes in the electrical resistance of the fluid between the conductive walls of said capsule member and the respective conductive end walls of said container when said capsule member is displaced along the axis of said chamber.

4. Apparatus as defined by claim 1 characterized in that said magnetic permeable material is permanently magnetized.

5. In an accelerometer
a rotor having an axial bore formed therein;
means for rotatably mounting said rotor;
an elongated container disposed in said bore and rotatably secured to said rotor, said container having non-conductive cylindrical side walls and conductive end walls forming a sealed chamber;
a conductive ring mounted on the inner cylindrical wall of said container;
a conductive fluid in said chamber;
a free capsule member immersed in said fluid, said free member having conductive walls;
at least one electric coil secured in said bore and positioned so as to surround an appreciable length of said chamber to establish a magnetic field;
the number of coil turns per unit axial length being varied so that the electromagnetic gradient along said chamber axis is a straight line function of the position of said capsule member along said chamber axis and wherein a permanent magnet is secured to said capsule member;
a plurality of brushes mounted on said rotor support means and being respectively electrically connected to said container end walls, said coil and said ring;
said rotor being adapted to be rotatably driven at high speeds about the axis of said chamber so as to create a radial pressure field in said fluid and thereby maintain the axis of said capsule member substantially coincident with the axis of said chamber;
and means for measuring the respective changes in the electrical resistance of the fluid between the conductive walls of said capsule member and the respective conductive end walls of said container when said capsule member is displaced along the axis of said chamber.

References Cited by the Examiner

UNITED STATES PATENTS

| | | | |
|---|---|---|---|
| 1,890,831 | 12/32 | Smyth | 74—5 X |
| 1,930,096 | 10/33 | Henderson | 264—1 |
| 1,991,129 | 2/35 | Urfer | 338—94 |
| 2,552,722 | 5/51 | King | 264—1 |
| 2,570,672 | 10/51 | Hathaway | 264—1 |
| 2,591,921 | 4/52 | Cosgriff | 264—1 |
| 2,677,270 | 5/54 | Sanderson | 264—1 |
| 2,762,123 | 9/56 | Schultz | 244—14.4 |
| 2,840,366 | 6/58 | Wing | 264—1 |

RICHARD C. QUEISSER, *Primary Examiner.*

N. H. EVANS, CHESTER L. JUSTUS, *Examiners.*